Patented May 10, 1932

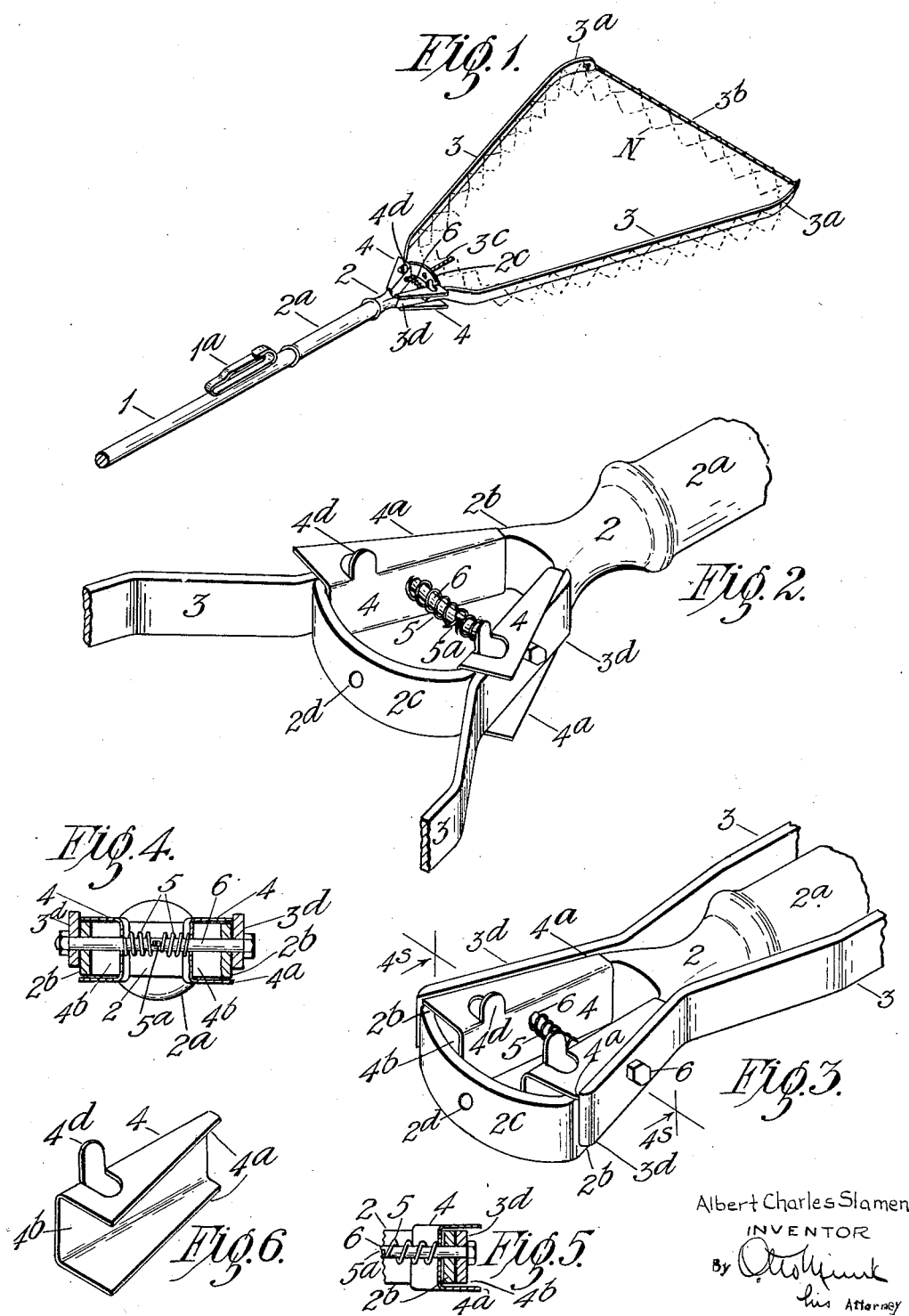

1,857,826

UNITED STATES PATENT OFFICE

ALBERT CHARLES SLAMEN, OF MELBOURNE, VICTORIA, AUSTRALIA

FISH LANDING NET

Application filed March 5, 1931, Serial No. 520,197, and in Australia April 5, 1930.

An object of my invention is to provide, for landing fish, and for the use of entomologists, collapsible nets having folding arms which will, when required, always open and close satisfactorily.

Another object is to provide the handle head with an improved fork having arm adjustment mechanism.

A further object is to provide improved net supporting means.

Fish, particularly when large or heavy, frequently escape from known landing nets, but such escapes are minimized by the use of my invention; and by such use various expenses hitherto necessary for repairs or replacements of parts are avoided.

I use pivoted arms which are held securely in extended position by spring pressed channelled sockets. These sockets are retractible from said arms which can then be folded back, but will be again held by the said sockets.

My construction is described herein with reference to the accompanying drawings.

Figure 1 is a perspective view of the open net with part of the handle and net omitted.

Figures 2 to 5 are on a larger scale.

Figure 2 is a perspective view of the handle head and parts of the adjacent arms in open position.

Figure 3 is a perspective view showing the parts in Figure 2, but with the arms closed abreast of the handle, the net being collapsed.

Figure 4 is a transverse section on line $4^s$—$4^s$ of Figure 3.

Figure 5 is a transverse section showing part of Figure 4, but with a socket in another position holding an arm in the position of Figure 2.

Figure 6 is a perspective view of a socket.

1 indicates any suitable stem or handle carrying a metal head 2, having, for example, a hollow shank $2^a$ for attachment to the handle. This head is forked, its diverging sides $2^b$ being shown connected by a bridge $2^c$. Movable arms 3, one at each side of the head, have their butts $3^d$ pivoted to the sides $2^b$ and carry the net. Each arm 3 is of any suitable size and strength, spring steel being suitable; and the arms when extended diverge widely as in Figure 1. Each arm has an inwardly extending outer end $3^a$, these ends being connected, an inextensible thong $3^b$ being illustrated. A net N is connected to the arms and to the thong; and also to the bridge $2^c$ for which purpose a cord $3^c$ and a bridge hole $2^d$ are shown.

Each side of the fork carries a channelled socket 4, the sockets being pressed apart by spring devices so that the channel sides normally project outwardly of the fork sides. As pressure means springs 5 are usable, each encircling part of a suitable, slightly curved, bolt 6, which extends through each socket 4, each fork side $2^b$ and each arm butt $3^a$. Between the springs is an abutment $5^a$—shown as a pin projecting through bolt 6.

I provide on each socket a lug $4^d$, shown integral with a channel side; the two lugs can, by the use of two fingers, be pressed towards one another from the position of Figure 2 to that of Figure 3, the effect being to retract the sockets simultaneously so that arms 3 become free to close, by gravity for example—or they may be swung by the user into closed position.

The bolt holes in the fork sides and the adjacent arm butts are not central of the widths of these parts, and when arms 3 are closed back as in Figure 4 the butts $3^d$ act as stops preventing the sockets springing outwardly, while the pressure by the sockets on the butts prevents too easy displacement of the latter so that the arms naturally remain closed. In Figure 5 the outer edges of the arms align with those of the fork sides and allow the socket channels to completely house the butts of the extended arms.

To extend the arms, the user will swing them on their pivots from the position in Figure 3, causing each butt to slide over a socket side, these sides $4^a$ being tapered as in Figure 6 so that they are, when retracted, parallel with the fork sides. While so sliding the butts keep the sockets retracted, until the arms reach their extended positions and align with the fork sides, whereupon the sockets become free to move outwardly and do so under pressure of springs 5—each channel $4^b$ then housing and locking an adjacent arm butt as in Figure 2.

When arms 3 are to be set abreast of the handle, the user presses lugs 4$^d$ towards one another thereby retracting the sockets as aforesaid.

I claim:

1. A net of the kind stated having supporting arms carried by sides of a handle head, each said side having pivoted to it the butt of one of the arms, and carrying a channelled socket which is resiliently pressed outwardly, each channel enclosing an arm butt when the arms are extended, and each socket pressing an arm butt so as to hold it when the arms are in closed position.

2. A net of the kind stated having a handle head having diverging sides, each with a channelled socket having a spring device pressing it outwardly, a bolt extending through the said sockets and sides, the butts of arms which carry the net being pivoted to the bolt.

3. The construction in claim 2, but in which the channelled socket sides are tapered, and in which, to allow the sockets to hold the arms serially in open and closed positions, the bolt holes are not medial of the widths of the sides of the fork or of the arm butts.

In testimony whereof I affix my signature.

ALBERT CHARLES SLAMEN.